(No Model.)
J. L. HANCOCK & N. SALAMON.
Elastic Tire.
No. 232,266.        Patented Sept. 14, 1880.
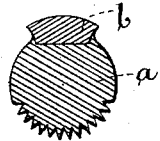
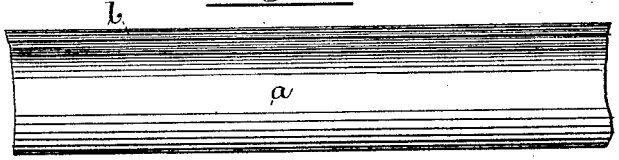
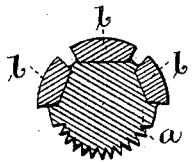
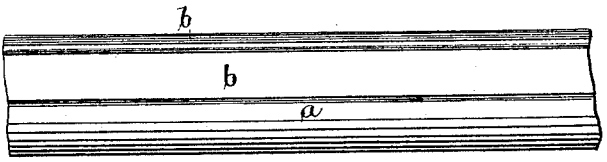
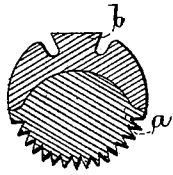
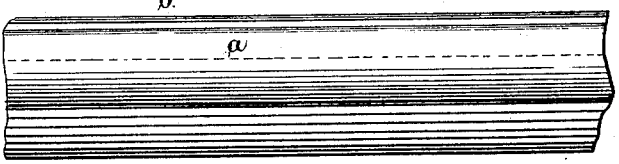
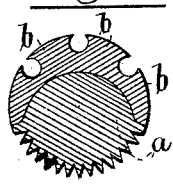
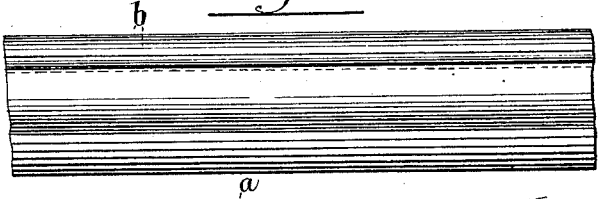
Witnesses:—
Louis M. Whitehead.
Fred Haynes
Inventor:—
John L. Hancock
Nahum Salamon
by their Attorneys
Brown & Brown

UNITED STATES PATENT OFFICE.

JAMES L. HANCOCK AND NAHUM SALAMON, OF LONDON, ENGLAND.

ELASTIC TIRE.

SPECIFICATION forming part of Letters Patent No. 232,266, dated September 14, 1880.

Application filed July 2, 1880. (No model.) Patented in England October 13, 1879.

*To all whom it may concern:*

Be it known that we, JAMES LYNE HANCOCK, of Goswell Road, in the city of London, England, india-rubber manufacturer, and NAHUM SALAMON, of Holborn Viaduct, in the city of London, England, sewing-machine factor, have invented certain Improvements in Elastic Wheel-Tires, of which the following is a specification.

This invention relates to improvements on the elastic wheel-tires patented in England by Mr. William Harrison, and bearing date July 27, 1877, No. 2,870, the chief object being to provide for bicycle-wheels an elastic tire that will have little tendency to slip while running over wet and uneven surfaces, and will, without detriment to its elasticity, present a good wearing-surface to the ground.

The invention also applies to the manufacture of tires for wheel-carriages generally.

Supposing it is desired to produce a tire for a bicycle-wheel, we mold the same of two qualities of compound rubber in a metal mold. Thus we first form a ring—say cylindrical in cross-section, which constitutes the cushion—from the ordinary Kerm's mineral compound in a dry soft state, and we apply thereto a fillet of friction-rubber compound, also in a dry soft state, so placed as to constitute the wearing-surface of the tire. This composite molded tire we submit to heavy pressure in the mold, and vulcanize it while in the compressed state. To insure a good holding for this tire on the rim of the wheel we form in the mold raised ribs, annular or otherwise, which will indent the portion of the elastic cushion that is to be bedded in the rim, after the manner described in the before-mentioned patent, in order to provide for the tire receiving a good body of cement for securing it in its seat in the rim of the wheel.

In the accompanying drawings, Figure 1 shows, in cross-section, and Fig. 2 in partial side view, one form of an elastic tire constructed according to our invention.

In these figures *a* is the cushion, composed of a solid ring of elastic rubber of the ordinary quality, and indented at its under side to receive adhesive cement.

*b* is a fillet of friction india-rubber compound, standing up from the cushion *a* and circumscribing the elastic ring. This fillet is about equal in breadth to one-half the cross-section of the cushion, and provides the tire with a tough elastic tread, which will present a good wearing-surface to the ground.

Fig. 3 shows, in cross-section, and Fig. 4 in partial side view, a modification of our improved tire, in which three narrow fillets, *b b b*, are molded with the cushion *a*. These fillets, it will be seen, stand out from the cushion and form the tread for the tire. The middle fillet will be the chief bearing-surface; but when the wheel shows any tendency to slip on one side, one or other of the side fillets will take its bearing on the ground, and thereby offer a resistance to the further lateral slipping of the wheel. In this, as in the former example, the fillets will be composed of friction india-rubber compound, the adhesion of the same to the cushion rubber being effected by pressure and vulcanization in the mold.

Figs. 5 and 6 show, in cross-section and partial side view, another form of an elastic tire. The wearing-surface of this tire is, as in the preceding examples, composed of friction-rubber; but it is in this case so disposed as not to project beyond a circle coinciding with the circumference of the cushion.

The friction-rubber *b* is divided up by parallel grooves, so as to form a central fillet and two shoulders, which shoulders will act, like the side fillets of Fig. 3, to check the slipping of the wheel.

Figs. 7 and 8 show, in cross-section and partial side view, an elastic tire with two fillets, *b b*, of friction-rubber, formed by dividing up that rubber by three parallel grooves. In this example the tread will be formed by what may be termed a "divided fillet," the adjacent angles of which will serve to check any tendency to slip, while the shoulders of the compound beyond the fillets will serve to arrest the lateral motion of the wheel in case slipping should commence.

When preparing a tire for railway-truck wheels, we mold a half-round cushion-ring, which is ribbed or grooved, as before explained, to receive the adhesive cement, and overlying and surrounding this cushion is a broad hoop of the friction-rubber. This tire we form in a metal mold and complete in the manner above set forth.

A tire of this character is also applicable to ordinary common road-vehicles, gun-carriages, and ambulances, the requisite elasticity being secured by the cushion of Kerm's mineral compound, or its equivalent, sulphur compound, and the durability of the tire being secured by employing the friction-rubber to form the tread. The adhesion of these tires to the fellies or rims will be by cement, the contact-surface of the cushions being grooved, as already explained, to hold the cement in sufficient quantity for effecting a firm junction with the felly or rim.

Having now set forth the nature of our invention, and explained the manner of carrying the same into effect, we wish it to be understood that we do not claim the combination of two kinds of india-rubber compound for the formation of elastic wheel-tires irrespective of the quality of such compounds, as what are known as "hard" and "soft" rubber have been combined for a purpose foreign to the object of our invention; but

What we claim is—

An elastic wheel-tire faced with friction-rubber, as described, such tire being compressed while in a dry, soft state in a mold, and subjected to the vulcanizing or curing operation while under pressure in the mold.

Dated the 25th day of May, 1880.

J. L. HANCOCK.
N. SALAMON.

Witnesses:
 CHAS. BERKLEY HARRIS,
 JOHN DEAN,
 *Both of 17 Gracechurch Street, London.*